US010771553B2

(12) United States Patent
Huang et al.

(10) Patent No.: US 10,771,553 B2
(45) Date of Patent: Sep. 8, 2020

(54) ACCESS TO DISPARATE CLOUD SERVICES

(71) Applicant: QUEST SOFTWARE INC., Aliso Viejo, CA (US)

(72) Inventors: Zhiguo Huang, Guangdong (CN); Liang Gong, Guangdong (CN); Mary Cindy Ah Kioon, Port Louis (MU); Michel Albert Brisebois, Renfrew (CA); Andrew John Leach, Cobourg (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 21 days.

(21) Appl. No.: 14/700,444

(22) Filed: Apr. 30, 2015

(65) Prior Publication Data
US 2016/0323381 A1 Nov. 3, 2016

(51) Int. Cl.
H04L 29/08 (2006.01)
G06F 3/0484 (2013.01)
G06F 16/14 (2019.01)
G06F 16/182 (2019.01)

(52) U.S. Cl.
CPC .......... H04L 67/1097 (2013.01); G06F 16/14 (2019.01); G06F 16/183 (2019.01)

(58) Field of Classification Search
CPC ... H04L 67/10; H04L 67/1097; H04L 67/327; H04L 41/0896; H04L 41/5003; G06F 3/04842; G06F 17/30321; G06F 17/30477; G06F 17/30554

USPC ........................................................ 709/219
See application file for complete search history.

(56) References Cited

U.S. PATENT DOCUMENTS

| 8,762,512 | B1* | 6/2014 | Sundaram | G06F 21/6218 709/223 |
| 8,813,174 | B1* | 8/2014 | Koeten | H04L 67/10 709/223 |
| 2011/0276713 | A1* | 11/2011 | Brand | H04L 67/1097 709/232 |
| 2012/0110044 | A1* | 5/2012 | Nagpal | G06F 17/30575 707/827 |
| 2012/0136960 | A1* | 5/2012 | Liu | G06F 17/30159 709/217 |
| 2013/0006865 | A1* | 1/2013 | Spates | G06Q 50/24 705/50 |
| 2013/0111404 | A1* | 5/2013 | Yang | G06F 17/30126 715/811 |
| 2013/0152183 | A1* | 6/2013 | Plewnia | H04L 9/3213 726/7 |
| 2013/0219176 | A1* | 8/2013 | Akella | H04L 63/0815 713/165 |

(Continued)

Primary Examiner — Ruolei Zong
(74) Attorney, Agent, or Firm — Maschoff Brennan

(57) ABSTRACT

Methods and information handling systems for managing at least one of storage of data to or access to data from a plurality of cloud storage drives coupled to user devices over a network. An information handling system includes a processing device and a memory that stores one or more program modules executable by the processing device to receive a request to store data from a user device, the request may lack information pertaining to where to store the data, to determine which of the cloud drives of the plurality of cloud drives will store the data in and to save the data to the cloud drive based on the determination.

20 Claims, 7 Drawing Sheets

(56) References Cited

U.S. PATENT DOCUMENTS

| | | | | |
|---|---|---|---|---|
| 2013/0238752 A1* | 9/2013 | Park | ............... | H04L 67/1097 |
| | | | | 709/217 |
| 2013/0291052 A1* | 10/2013 | Hadar | ............... | G06F 21/6218 |
| | | | | 726/1 |
| 2013/0305039 A1* | 11/2013 | Gauda | ............... | G06F 21/6218 |
| | | | | 713/153 |
| 2014/0006350 A1* | 1/2014 | Fukui | ............... | G06F 16/192 |
| | | | | 707/632 |
| 2014/0075499 A1* | 3/2014 | Arun | ............... | H04L 41/5041 |
| | | | | 726/1 |
| 2015/0154418 A1* | 6/2015 | Redberg | ............... | G06F 21/602 |
| | | | | 713/165 |

\* cited by examiner

ACCESS TO DISPARATE CLOUD SERVICES

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With advance in technology over the years, there has been a marked shift toward cloud based services. Bring Your Own Cloud (BYOC) is one very popular concept. With BYOC, employees are allowed by their company's information handling system to use public (owned and operated by third-party service providers) and private (built for an individual enterprise) cloud services to perform certain job roles.

There are circumstances in which a person could be using multiple public cloud services, a common situation. This undeniably leads to challenges.

For example, with multiple cloud storage services, a user runs the risk of having multiple sync processes running on their computer. These processes compete for resources, which can lead to a decrease in performance.

Also, when a user uses multiple cloud storage services, the user may find it difficult to keep track of which cloud storage (i.e., cloud drive) has how much free space available. The user would have to access each of their cloud drives until they find the most appropriate cloud storage for a particular storage need. Therefore, it is most likely that they will not be making full use of all their cloud storage.

Having data in numerous cloud drives makes it laborious to find any particular data. The user may be forced to segregate his files and remember exactly where to find them.

Also, personal and business data will need to be protected from data leaks, and personal information (like personal photos) should likewise be prevented from being exposed unintentionally within the user's company.

As cloud technology evolves, improved cloud productivity within enterprises is needed.

SUMMARY

In some embodiments, an information handling system manages at least one of storage of data to or access to data from a plurality of cloud storage drives coupled to the processing device over a network. The system includes a processing device and memory that stores one or more program modules that are executable by the processing device to receive a request to store data from a user's device, the request may lack information pertaining to where to store the data; determines which of the cloud drives of the plurality of cloud drives will store the data in; and saves the data to the cloud drive based on the determination.

The modules are further executable by the processing device to receive from the user's device a request for data stored at one of the plurality of cloud drives, the request may lack information pertaining to where the data is stored; to determine which of the cloud drives of the plurality of cloud drives is storing the requested data and to retrieve the requested data from the cloud drive determined to be storing the requested data.

The one or more modules are further executable by the processing device to generate an index of data files stored at the cloud drives associated with the user and receive a search query from a user's device, the search query may lack information pertaining to any of the cloud drives associated with the user.

BRIEF DESCRIPTION OF THE DRAWINGS

A more complete understanding of the present disclosure may be obtained by reference to the following Detailed Description, when taken in conjunction with the accompanying Drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
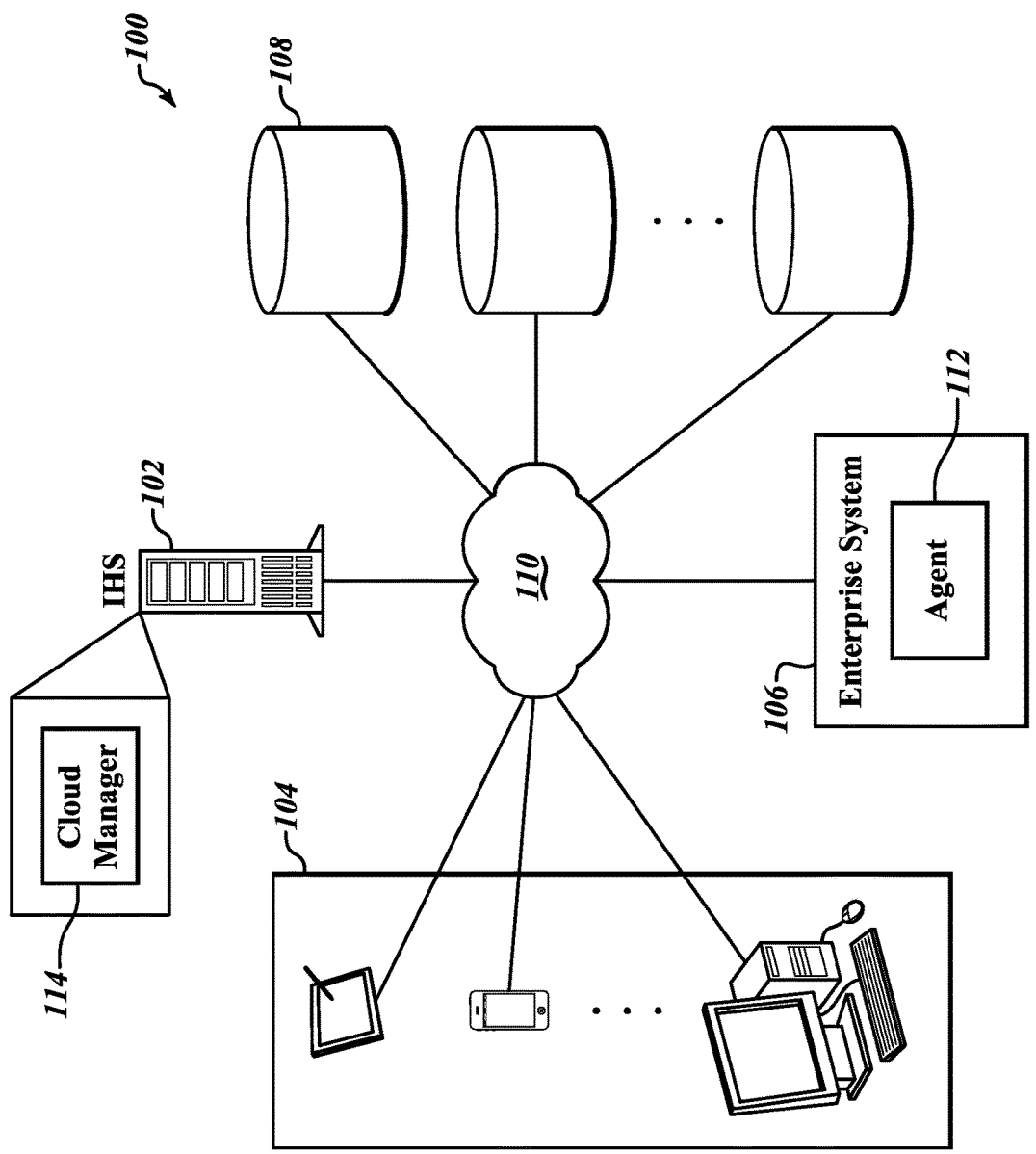
FIG. 1 shows an environment for providing access to disparate cloud services.

FIG. 1 illustrates an example of a cloud service system 100 for allowing a user access to data or data storage services controlled by various personal and corporate cloud service entities. Personal cloud storage and access services include cloud services provided to multiple users not particularly affiliated with a specific corporate entity. Examples include Dell Toad™ for Cloud Databases. Corporate cloud storage and access services include cloud services provided to multiple users that are affiliated with a specific corporate entity. Cloud services are defined as services made available to users on demand via a network (e.g., the Internet) from a cloud-computing provider's servers as opposed to being provided from one's own on-premises servers. Cloud services are designed to provide easy, scalable access to applications, resources and services, and are fully managed by a cloud services provider. Examples of cloud services include online data storage and backup solutions, Web-based e-mail services, hosted office suites and document collaboration services, database processing, managed technical support services and more.

System 100 may include information handling system (IHS) 102 that is in data communication with a plurality of user devices 104, one or more enterprise systems 106, a plurality of cloud storage/access service providers 108 over one or more public or private data network 110. Enterprise systems 106 may include one or more agent devices 112 and may optionally include IHS 102. IHS 102 includes a cloud manager 114 that manages access to cloud storage/access services at providers 108 by user devices 104 operated by individual users. User devices 104 communicate with IHS 102 and present to the user, via an interface device (e.g., monitor), a tool that allows the user to easily store or retrieve data to/from the cloud service providers 108. This tools described in more detail below with regard to FIG. 4.

Figure 2:
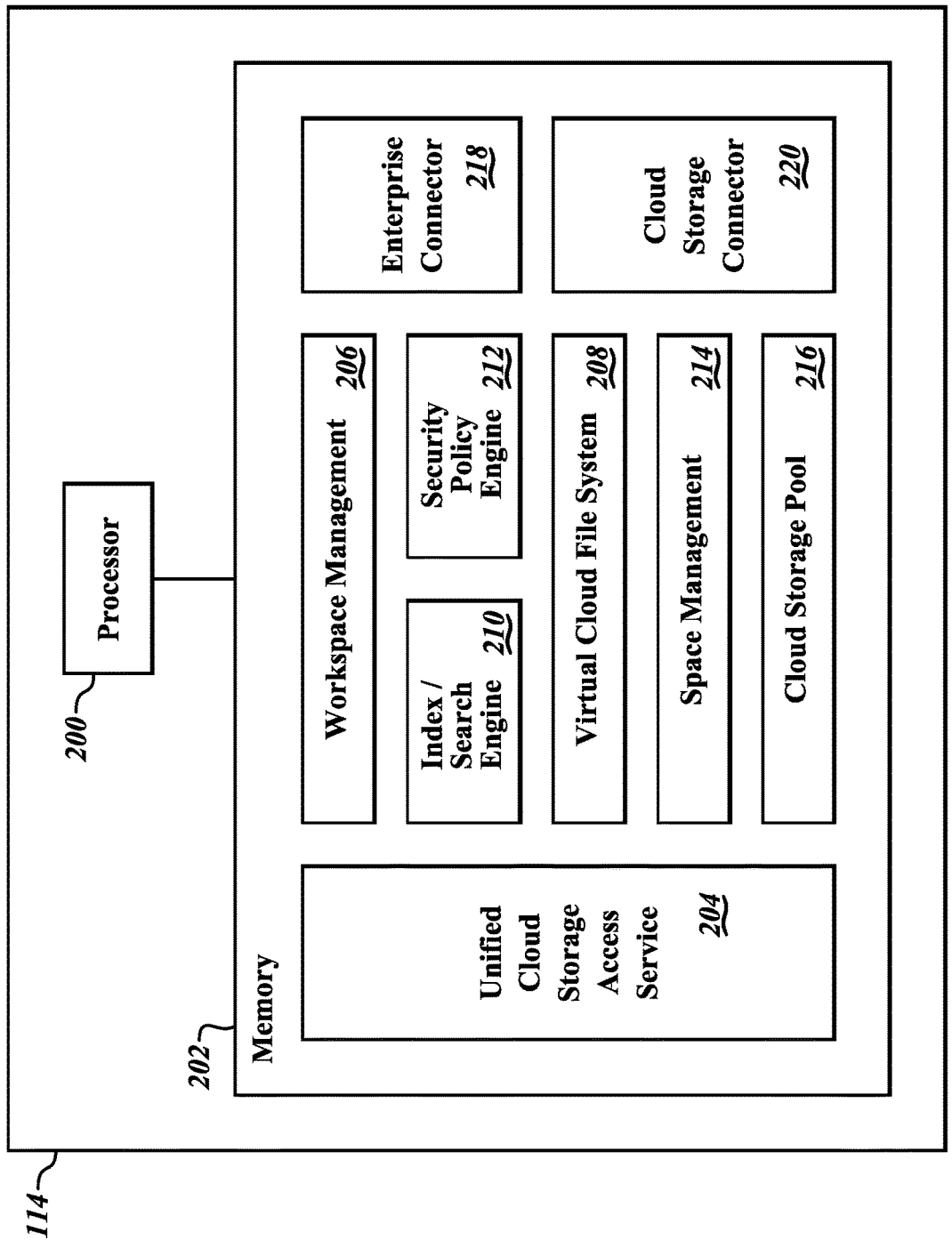
FIG. 2 shows an example of an information handling system for managing user access to cloud service providers.

As shown in FIG. 2, cloud manager 114 may include processor(s) 200 and memory 202. Memory 202 may include a unified cloud storage access service module 204, a workspace management module 206, a virtual cloud file system module 208, an index/search engine module 210, a security policy engine module 212, a space management module 214, a cloud storage pool module 216, an enterprise connector module 218, and a cloud storage connector module 220.

Figure 3:
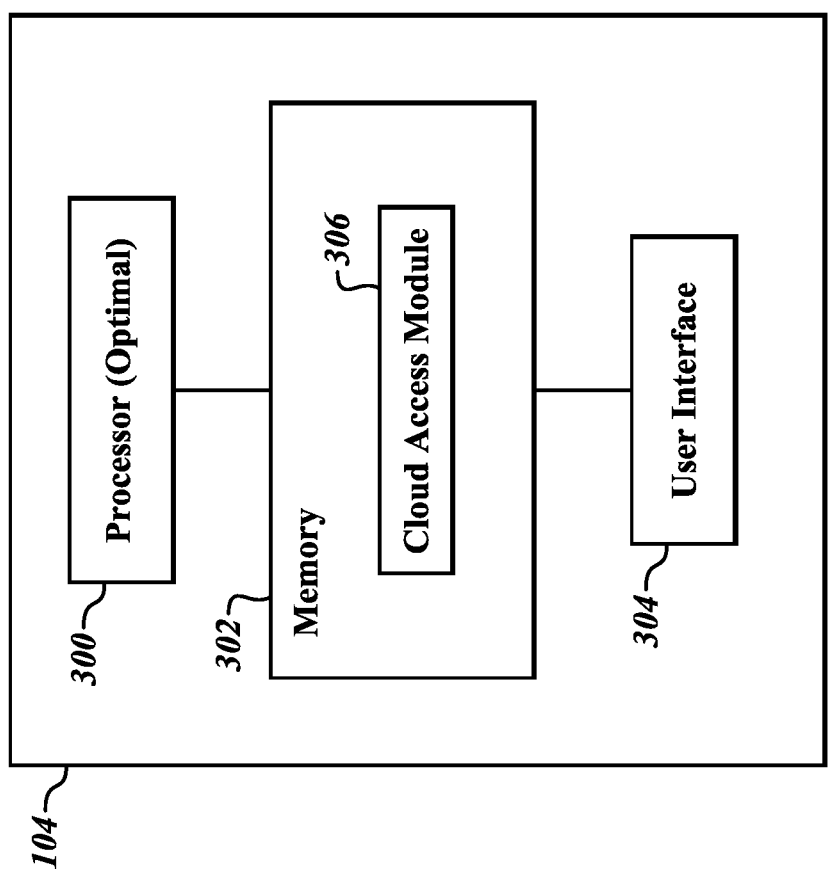
FIG. 3 shows an example of a user device configured to interact with the information handling system shown in FIG. 2.

As shown in FIG. 3, user devices 104 may include processor 300, memory 302 and user interface 304. Processor 300 may be optional if user device 104 is a dummy-type peripheral device that relies on IHS 102 for execution of associated functions. Memory 302 may include at least one cloud access module 306.

Figure 4:
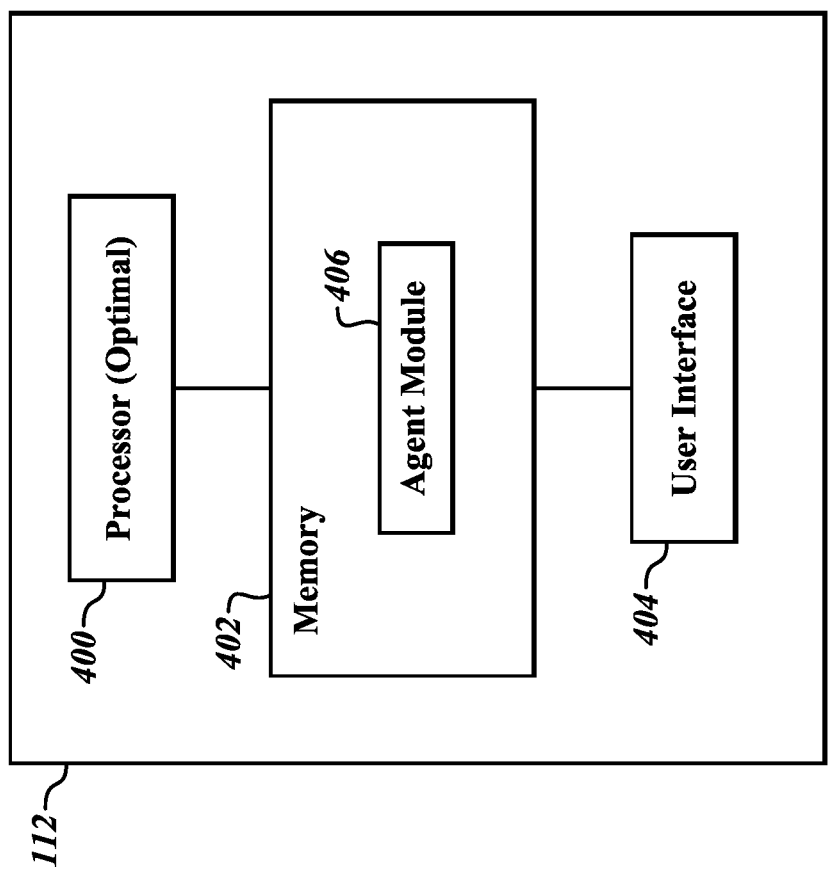
FIG. 4 shows an example of an agent device configured to interact with the information handling system shown in FIG. 2.

As shown in FIG. 4, agent devices 112 may include processor 400, memory 402 and user interface 404. Processor 400 may be optional if user device 104 is a dummy-type peripheral device that relies on IHS 102 for execution of associated functions. Memory 402 may include at least one agent module 406.

Each of processors 200, 300, 400 may include a microprocessor, controller, a programmable logic device such as a field-programmable gate array (FPGA), an application-specific integrated circuit (ASIC), or other hardware resource operable to provide the ability to search through AD information of users' email accounts to assess what accounts to include in a migration collection.

Memory 202, 302, 402 may be any form of volatile or nonvolatile memory including magnetic media, optical media, RAM including dynamic RAM (DRAM) and static RAM (SRAM), ROM, erasable/programmable memory, solid-state memory, such as flash memory, removable media, or any other suitable local or remote memory component or components. Memory 202, 302, 402 may store any suitable data or information utilized by the processors 200, 300, 400, including one or more software modules embedded in a computer-readable medium, and/or encoded logic incorporated in hardware. In particular embodiments, memory 202, 302, 402 may include main memory for storing instructions for processors 200, 300, 400 to execute or data for processors 200, 300, 400 to operate on. In particular embodiments, one or more memory-management units (MMUs) may reside between processors 200, 300, 400 and memory 202 and facilitate access to memory 202, 302, 402 requested by processors 200, 300, 400. As used herein, memory does not include purely transitory media, such as signals and communication media. As such, memory is a form of nontransitory computer-readable media. As used herein, nontransitory computer-readable media include one or more of optical storage, magnetic storage, RAM, ROM, solid-state memory such as flash memory, a hard disk drive, a floppy drive, tape storage, a smart card, an integrated circuit, and so forth.

Software modules include one or more of applications, bytecode, computer programs, executable files, computer-executable instructions, program modules, code expressed as source code in a high-level programming language such as C, C#, C++, Perl, Java®, or other, a low-level programming code such as machine code, etc. An example of a software module is a BIOS file. A software module may include an application programming interface (API), a dynamic-link library (DLL) file, an .exe file, firmware, and so forth.

Processors 200, 300, 400 may include more than one processor, such as may be distributed across private and/or public data network(s). Also, any of the modules may include components stored at memory distributed across the private and/or public data network(s). The different modules may be stored on the same storage device or may be stored on multiple data storage devices across the private and/or public data network(s).

IHS 102 supports two kinds of workspaces: personal and corporate. By default, the corporate workspace would have security engine functionality enabled, unlike the personal workspace (that the user would need to enable). A user is able to switch workspaces between personal or corporate, thus separating personal and enterprise data.

IHS 102 may include modules specifically tailored to a single corporate entity. In this example, IHS 102 would manage security and access to cloud storage/access service providers 108 that are affiliated with the corporate entity according to predefined corporate policies related to cloud storage/access service providers 108. IHS 102 also manages access to other cloud storage/access service providers 108 that are not affiliated with the corporate entity based on user-defined instructions and/or predefined corporate policies associated with the other cloud storage/access service providers 108. IHS 102 may also include modules for supporting multiple different corporate entities and their associated and/or non-associated cloud storage/access service providers 108.

Below are two features that IHS 102 may also provide. Firstly, file management operations may be transparent. Actions such as upload and download of the processes are transparent to the user. When uploading a file, the user does not have to designate which cloud storage/access services provider 108 (i.e., cloud drive) to upload to. IHS 102 will automatically discover an appropriate cloud drive for uploading/downloading data based on determinations of at least availability of free storage, network speed associated with each of the cloud drives, costs, security factors, reliability factors, and/or other factors. From the user's perspective, the user interacts with the system as if he or she is uploading/downloading from a single cloud drive, but in reality, the uploading/downloading may be occurring at different cloud drives. Secondly, IHS 102 uses an efficient file organization system, which is organized by collections as they might relate to content, title, or other defining factors. The following are examples of file organization software systems for use by the IHS 102. Smart Collections allows the user to avoid the tedious work of moving files around to an appropriate place. Smart collections include documents, movies, music and pictures. These collections will help the user keep all files organized by type.

The user can alter her collections by creating her own custom collections. The user can create subcollections to help better organize files. Also, the user can name these collections in a way that is meaningful to her. The collection name can be of any length and can support different languages and/or special characters.

Unified cloud storage access service module 204 provides an interface between the cloud storage/access service providers 108 and the various applications on the user device(s) 104. Unified cloud storage access service module 204 may connect to applications (e.g., cloud access module 306) located at the client devices 104 and provide those client side applications with the data that enables the client side applications to render a user interface (UI) of a virtual workspace. For example, the UI presents folders with contents/files and their original storage location. The UI also displays data relating to applicable policies such as security, data loss, or other organizational policies. This data related to applicable policies may be transmitted back to HIS 102 for analysis.

Workspace management module 206 provides logic that ties all the components of system 100 together. Workspace management module 206 gets status updates from the components/modules. Workspace management module 206 sends communications to all components/modules instructing them how to operate. Workspace management module 206 controls data flow between user devices 104 and cloud storage services 108. Workspace management module 206 controls when, where, how and by whom corporate data are being collected, manipulated, stored and/or transferred. Workspace management module 206 can give information technology (IT) personnel a view of who opened which documents, or modified them.

Virtual cloud file system module 208 creates and maintains a file topology for saving, retrieving, deleting, etc. Virtual cloud file system module 208 creates the user model view. For example, the virtual cloud file system module 208 may create a single view for storage with all stored files in the same folder. In another example, virtual cloud file system module 208 may create multiple views with different ones of the stored files in different folders. Virtual cloud file system module 208 includes virtual storage elements, which can be classified as folders, files or collections. These individual storage elements correspond to files stored in one of the cloud storage/access service providers 108 and the virtual storage elements may be visible in a user interface, and they may represent abstractions of the files or other stored elements in one of the cloud storage/access service providers 108. The virtual storage elements may be stored in a binary cache file in the IHS 102, and may correspond to different files stored in one or more cloud storage/access service providers 108. For example, if the user has file A stored in one of the cloud storage/access service providers 108, then the user will see a virtual storage element corresponding to file A in his cloud storage as a binary cache file.

Index/search engine module 210 manages a unified directory of indexes and allows users to search for items saved on all cloud storage locations (e.g., providers 108). Index/search engine module 210 creates an index of the storage elements for a particular user. Index/search engine module 210 manages the "machine view" of the storage location and contents. Index/search engine module 210 allows a user to perform a cross-cloud storage search by searching the index. In this way, the user would have to search from only one location, but behind the scenes, index/search engine module 210 searches across multiple cloud storage drives. A search result may point to one of the virtual storage elements that corresponds to an item stored at one of the cloud storage/access service providers 108. Alternatively, the search result may point directly to the stored item directly on one of the cloud storage/access service providers 108.

Security policy engine module 212 applies data loss prevention (DLP) policies as dictated by enterprise IT (e.g., agent device 112). Security policy engine module 212 integrates with an enterprise's infrastructure. Security policy engine module 212 applies security policies on virtual storage elements. Security policy engine module 212 can restrict some particularly sensitive information from being transferred or manipulated by setting different security policies on the two different workspaces. In one example, a single security policy exists within any workspace. The security policy for the workspace would then be applied to numerous disparate cloud accounts associated with the same workspace. In other words, the workplace, whether corporate or personal, decides how files should be handled and is responsible for applying the security rules on the different cloud accounts. For example, if an employee leaves the company, then security policy engine module 212 prevents that employee from accessing private enterprise clouds anymore. In the event of a lost device, security policy engine module 212 may remotely remove that employee's access to these clouds from that device. In one example, the security policy engine module 212 includes an encryption/decryption module that will protect the data-at-rest within the workspaces, and also during data transfer. This ensures that sensitive corporate data are kept safe and reliable.

Space management module 214 provides an assessment engine for determining a location for storage based on one or more parameters (e.g., availability, cost, security, etc.) Space management module 214 can determine where to store files and/or to retrieve files from based on the type of action being performed, the file type, content of the file or other factors that might distinguish a personal user action from a corporate user action.

Figure 7:
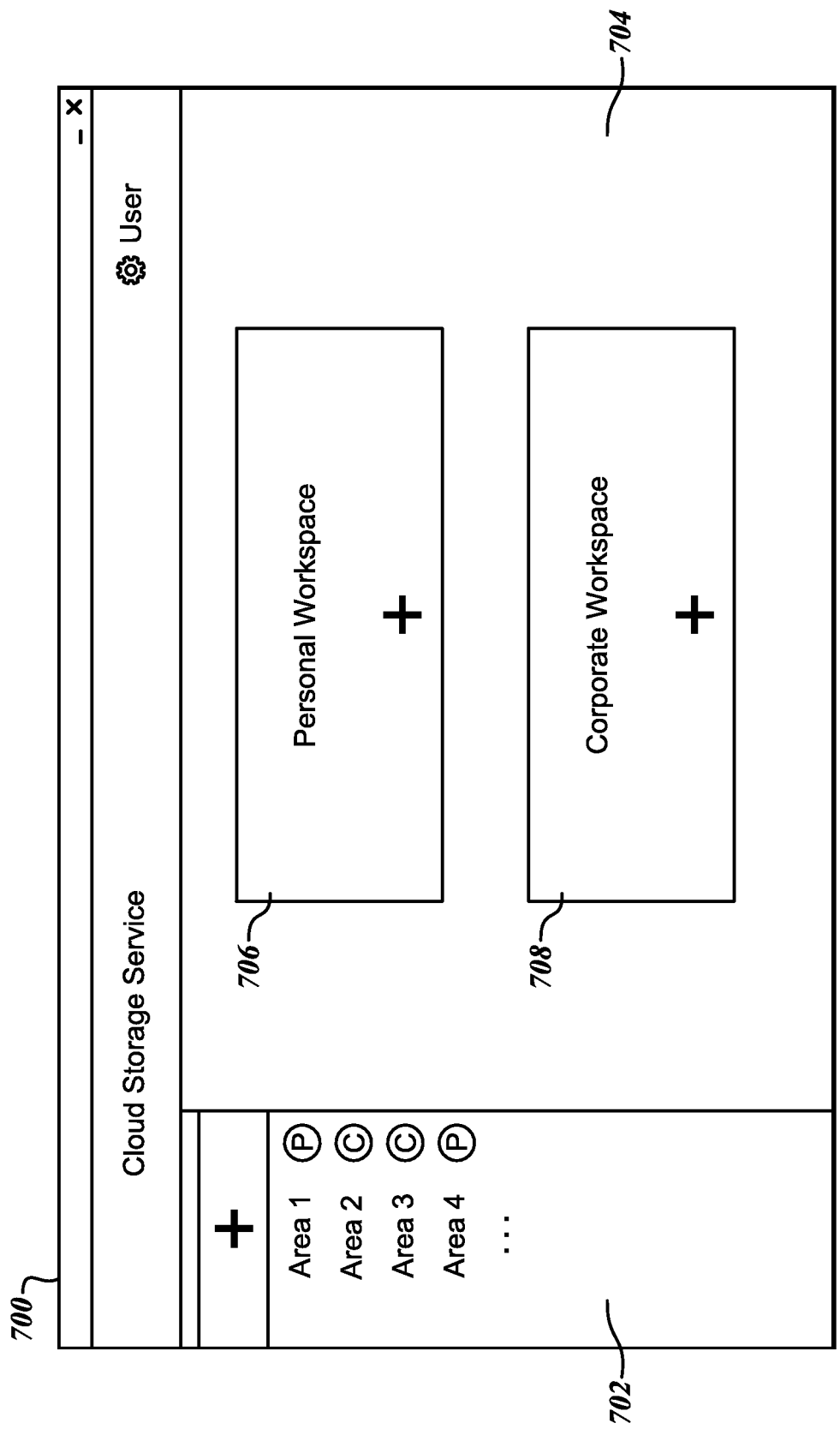
FIG. 7 shows an example of a graphical user interface presented to a user at a user's device.

Cloud storage pool module 216 creates an aggregate view of the disparate cloud storage/access service providers 108, see FIG. 7 as an example. Cloud storage pool module 216 provides a resource pool. The resource pool is where all of the user's personal/corporate cloud drives are integrated. Cloud storage pool module 216 allows a user to create as many cloud spaces as desired. After a user has added and connected to each of his cloud storage service providers 108 using an interface (e.g., graphical user interface (GUI)) provided at their client device 104 via cloud access module 306, the user can access his cloud spaces—services provided by cloud storage service providers 108. Each cloud space can be made up of one or more cloud drives. The cloud space or GUI may be provided by cloud access module 306 that is in the form of thin-client software, an application program interface (API) or comparable software that is located at client device 104. The cloud access module 306 communicates with cloud storage pool module 216 at IHS 102.

Enterprise connector module 218 may provide an enterprise IT control link for authentication, DLP, reporting, etc. Enterprise connector module 218 collects usage data that could be sent to an administration UI for reporting purpose. The administration UI allows an administrator to at least install, configure features, and report information related to the module(s) of the IHS 102 and/or the user devices 104.

Cloud storage connector module 220 manages links and authentication of individual services. Cloud storage connector module 220 provides a direct link to cloud storage service providers 108. Cloud storage connector module 220 manages uniform resource locators (URLs) or Internet protocol (IP) information, credentials (for personal accounts), virtual private network (VPN) information and credentials for access to one or more cloud storage/access service providers 108.

Services provided by the IHS 102 are either provided at an enterprise application server (e.g., agent device 112) or is provided as a cloud service. It connects via the network 110 to various end-user applications. IHS 102 may also connect via either Internet or intranet to the enterprises authentication and security services provided by enterprise system 106 (e.g., active directory (AD), DLP application or a firewall application like SonicWall™). IHS 102 may use these existing resources to authenticate and apply known policies. IHS 102 may also connect via the Internet to the various cloud storage service providers 108 associated with third parties or by VPN to internal enterprise stores, such as what might be provided via SharePoint™ or Notes™.

Figure 5:
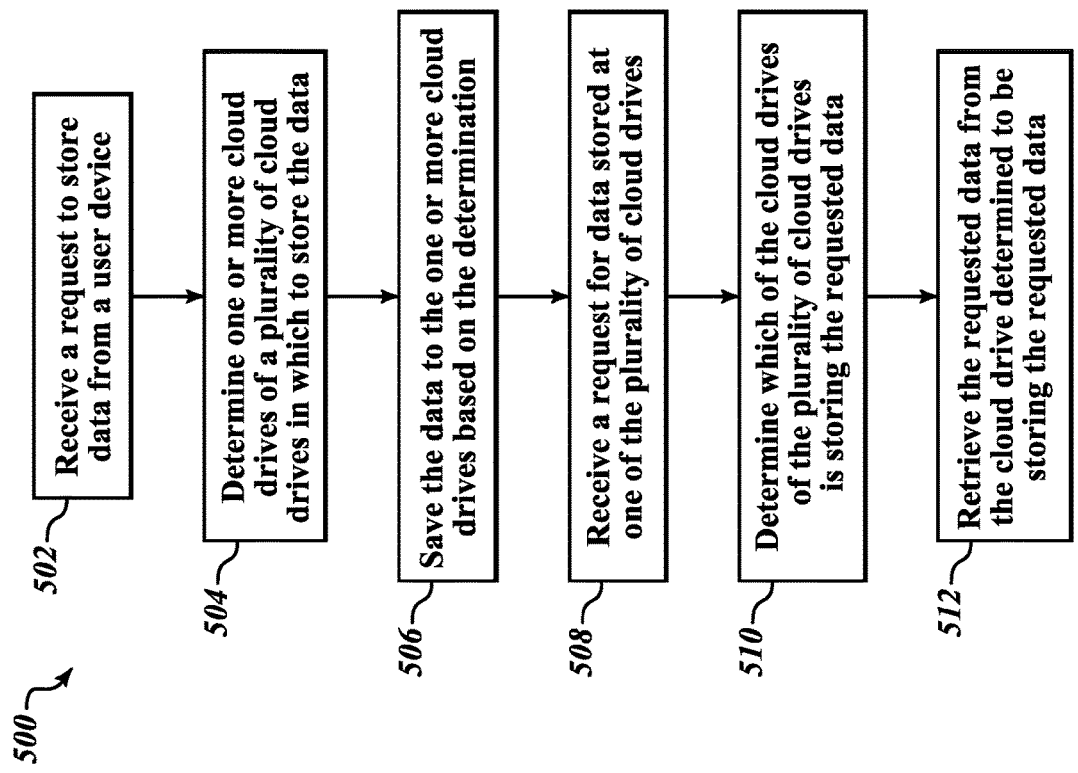
FIG. 5 shows an example of a process of storing and retrieving data from cloud drives as performed by the system shown in FIG. 1.

FIG. 5 shows an example of a process 500 of storing and retrieving data from cloud drives as performed by the system 100 shown in FIG. 1. First, at a block 502, a request to store data is received from a user device. The request indicates the data or file that a user of the user device using a GUI desires to store. For example, while working in a specific application the user may select a store function or store to cloud function. This selection by the user generates the request to store the data.

At a block 504, the IHS determines one or more cloud drives of a plurality of cloud drives in which to store the data based on one or more predefined cloud storage policies. The IHS determines the cloud drive(s) in which to store the data or file that indicated in the request by analyzing information (e.g., metadata) associated with the data or file, content of the data or file, the type of the data or file, information associated with the user, or other information that can be used to distinguish the destination of the data or file.

At a block 506, the data is saved to the one or more cloud drives based on the determination. Various levels of encryption may be applied to the data that is being saved depending upon the cloud drive(s) that is determined to receive the data.

At a block 508, a request for data stored at one of the plurality of cloud drives is received at the IHS from the user device. The request indicates the data or file that the user of the user device desires to retrieve from cloud storage. The user may provide indication via a user interface (e.g., FIG. 7).

At a block 510, the IHS determines which of the cloud drives of the plurality of cloud drives is storing the requested data. The IHS determines which of the cloud drive(s) is currently storing the data or file indicated in the request by analyzing information (e.g., metadata) associated with the request, the type of the data or file being requested, information associated with the user making the request, or other information that can be used to distinguish the source of the desired data or file.

At a block 512, the IHS retrieves the requested data from the cloud drive determined to be storing the requested data and delivers the retrieved data to the user device making the request.

Figure 6:
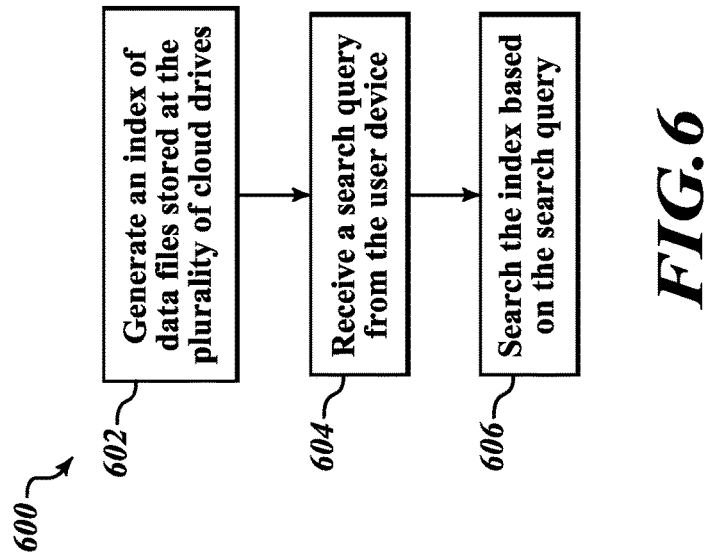
FIG. 6 shows an example of a process for searching the cloud drives as performed by the system shown in FIG. 1.

As shown in FIG. 6, a flowchart of an example process 600 performed by system 100 of FIG. 1. First, at a block 602, the IHS generates an index of data files stored at the plurality of cloud drives. This is performed for the data files and cloud drives associated with a particular user, system or other entity.

At a block 604, the IHS receives a search query from the user device based on user operation of a GUI presented at the user device.

Then at a block 606, the IHS searches the index based on the search query and presents results to the user device. The presented results may include information about where data/files associated with the search query. Also, the presented results may retrieve data/files associated with the search query from the associated cloud drive based on the index.

As shown in FIG. 7, an example of a GUI 700 may be presented to a user on user device 104. GUI 700 may include area listing section 702 and workspace 704. Area-listing section 702 includes a list of areas created by default or by the user of user device 104. Each area listed in area listing section 702 is identified as personal (P) or corporate (C). Each area may be associated with one or more user and may include user interface access to one or more cloud drives (e.g., cloud storage service providers 108.) Areas identified as corporate may be associated with the enterprise system 106 associated with the user. Areas identified as private may include cloud drives that do not adhere to policies associated with the enterprise system 106 associated with the user. Upon user activation of an area listed in area-listing section 702, workspace 704 will present associated cloud drive workspace links.

Workspace 704 includes personal workspace link 706 and corporate workspace link 708. When the user activates either workspace link 706 or 708, the user is presented with the personal or corporate cloud drives associated with those respective workspaces.

Figure 8:
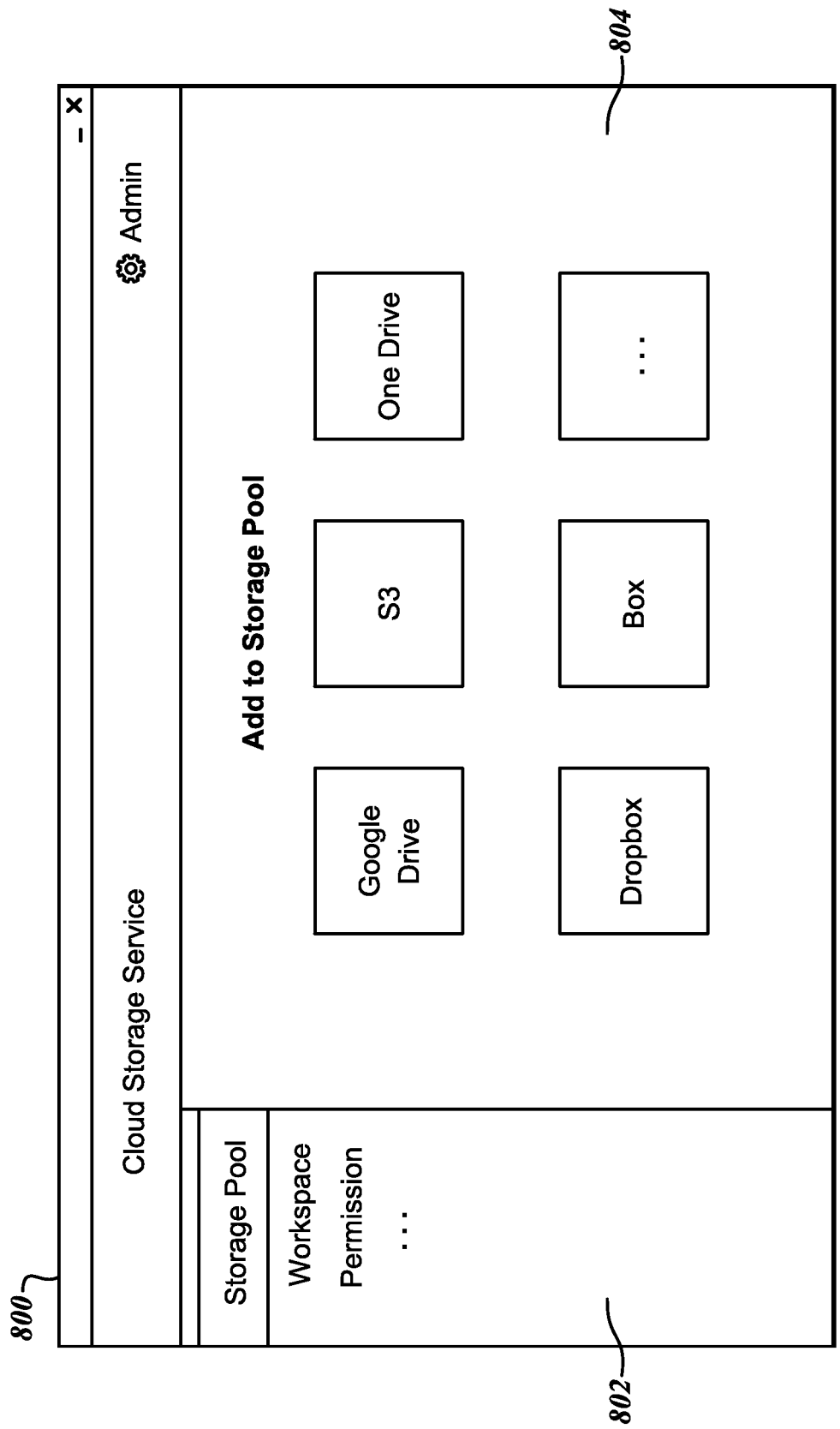
FIG. 8 shows an example of a graphical user interface presented to an administrative agent at an agent's device.

As shown in FIG. 8, an example of an administration GUI 800 may be presented to an agent at agent device 112. GUI 800 may include menu section 802 and workspace section 804. Menu section 802 includes a storage pool assignment tab, a workspace assignment tab, a permission assignment tab, and other tabs for assigning other features. Upon user selection of storage pool assignment tab, workspace section 804 presents available cloud drives. The available cloud drives are those cloud drives made available to the corporate entity associated with agent device 112. The agent may select one or more of the presented cloud drives. Upon agent selection of the presented cloud drives, user(s) associated with the same corporate entity as the agent are given access to the agent-selected cloud drives.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the scope of the present disclosure.

What is claimed is:

1. A method, comprising:
    authenticating a user with a plurality of cloud service providers;
    receiving, by an information handling system, a request to store data from a user device in a user workspace;
    determining, by the information handling system, a plurality of cloud drives associated with the user workspace that are associated with at least two of the plurality of cloud service providers;
    determining one or more factors, including an amount of free storage, an access speed, and a cost, associated with individual cloud drives of the plurality of cloud drives;
    saving, by the information handling system, the data on the plurality of cloud drives based at least in part on the one or more factors;
    updating a search index of data files stored at the plurality of cloud drives to include the data stored on the one or more cloud drives;
    authenticating the user with the at least two of the plurality of cloud service providers;
    receiving a search request for a particular data file;
    performing a search for the particular data file in each of the plurality of cloud drives using the search index of data files;
    identifying, in the search index of data files, an indication that the particular data file is stored in a first cloud drive;
    providing a result of the search request, the result including information about the first cloud drive where the particular date file is stored;
    receiving a request to transfer the particular data file in the first cloud drive that is associated with a first security level to a second cloud drive associated with a second security level; and
    applying a security policy associated with the user workspace to the at least two of the plurality of cloud drives associated with the user workspace, wherein applying the security policy to the at least two of the plurality of cloud drives associated with the user workspace includes restricting transfer of the particular data file from the first cloud drive to the second cloud drive based on the first cloud drive being associated with the first security level and the second cloud drive being associated with the second security level.

2. The method of claim 1, further comprising:
    receiving, by the information handling system from the user device, a request to retrieve particular data stored at one of the plurality of cloud drives;
    determining, by the information handling system, at least one cloud drive of the plurality of cloud drives that is storing the particular data; and
    retrieving, by the information handling system, the particular data from the at least one cloud drive that is storing the particular data.

3. The method of claim 1, further comprising:
    generating, by the information handling system, the search index of data files stored on the plurality of cloud drives; and
    receiving, by the information handling system, a search query from the user device requesting a location of a particular data file.

4. The method of claim 1, wherein the plurality of drives comprises at least one cloud drive of a first entity associated with a user of the user device.

5. The method of claim 4, wherein saving the data is based on one or more rules defined by the first entity.

6. The method of claim 4, wherein the plurality of drives comprises at least one second drive associated with the user of the user device.

7. The method of claim 6, wherein the security policy is based on one or more rules defined by at least one of the user of the user device or the first entity.

8. The method of claim 1, further comprising:
    causing, by the information handling system, a user interface to be displayed on the user device, the user interface showing the plurality of cloud drives associated with the user workspace.

9. The method of claim 8, further comprising:
    receiving, by the information handling system, one or more selections of cloud drives from the user interface; and
    associating, by the information handling system, one or more cloud drives to the user workspace of the user device based on the one or more selections.

10. An information handling system, comprising:
    a processing device; and
    memory configured to store one or more program modules executable by the processing device to:
        authenticate a user with a plurality of cloud service providers;
        receive a request to store data from a user device in a user workspace;
        determine a plurality of cloud drives associated with the user workspace that are associated with at least two of the plurality of cloud service providers;
        determine one or more factors, including an amount of free storage, an access speed, and a cost, associated with individual cloud drives of the plurality of cloud drives;
        save the data on one or more cloud drives based at least in part on the one or more factors update a search index of data files stored at the plurality of cloud drives to include the data stored on the one or more cloud drives;
        authenticate the user with the at least two of the plurality of cloud service providers;
        receive a search request for a particular data file;
        perform a search for the particular data file in each of the plurality of cloud drives using the search index of data files;
        identify, in the search index of data files, the particular data file in a first cloud drive;
        provide a result of the search request, the result including information about the first cloud drive where the particular date file is stored;
        receive a request to transfer the particular data file in the first cloud drive that is associated with a first security level to a second cloud drive associated with a second security level; and
        apply a security policy associated with the user workspace to the at least two of the plurality of cloud drives associated with the user workspace, wherein applying the security policy to the at least two of the plurality of cloud drives associated with the user workspace includes restricting transfer of the particular data file from the first cloud drive to the second cloud drive based on the first cloud drive being associated with the first security level and the second cloud drive being associated with the second security level.

11. The information handling system of claim 10, wherein the one or more program modules are further executable by the processing device to:
receive, from the user device, a request to retrieve particular data stored at one of the plurality of cloud drives;
determine at least one cloud drive of the plurality of cloud drives that is storing the particular data; and
retrieve the particular data from the at least one cloud drive that is storing the particular data.

12. The information handling system of claim 10, wherein the one or more program modules are further executable by the processing device to:
generate the search index of data files stored on the plurality of cloud drives; and
receive a search query, from the user device, the search query requesting a location of a particular data file.

13. The information handling system of claim 10, wherein the plurality of drives comprises at least one cloud drive of a first entity associated with a user of the user device.

14. The information handling system of claim 13, wherein the security policy is based on one or more rules defined by the first entity.

15. The information handling system of claim 13, wherein the plurality of drives comprises at least one second drive associated with the user of the user device.

16. The information handling system of claim 15, wherein one or more rules defined by at least one of the user of the user device or the first entity are used to save particular data to the user workspace and to retrieve the particular data from the user workspace.

17. The information handling system of claim 15, wherein the one or more program modules are further executable by the processing device to:
cause a user interface to be displayed on the user device, the user interface showing a plurality of cloud drives made available to the user device.

18. The information handling system of claim 17, wherein the one or more program modules are further executable by the processing device to:
receive one or more selections of cloud drives from the user interface; and
associate one or more cloud drives to the user of the user device based on the one or more selections.

19. One or more non-transitory storage media storing instructions executable by one or more processors to perform operations comprising:
authenticating a user with a plurality of cloud service providers;
storing user account information comprising information associated with a user workspace comprising a plurality of cloud drives including a first cloud drive and a second cloud drive;
receiving a request to store data from a user device in the user workspace;
determining one or more cloud drives associated with the user workspace that are associated with at least two of the plurality of cloud service providers;
determining one or more factors, including an amount of free storage, an access speed, and a cost, associated with individual cloud drives of the plurality of cloud drives;
saving the data on the one or more cloud drives based at least in part on the one or more factors;
updating a search index of data files stored at the plurality of cloud drives to include the data stored on the one or more cloud drives;
authenticating the user with the at least two of the plurality of cloud service providers;
receiving a search request for a particular data file;
performing a search for the particular data file in each of the plurality of cloud drives using the search index of data files;
identifying, in the search index of data files, the particular data file in a first cloud drive;
providing a result of the search request, the result including information about the first cloud drive where the particular date file is stored;
receiving a request to transfer the particular data file in the first cloud drive that is associated with a first security level to a second cloud drive associated with a second security level;
applying a security policy associated with the user workspace to the at least two of the plurality of cloud drives associated with the user workspace, wherein applying the security policy to the at least two of the plurality of cloud drives associated with the user workspace includes restricting transfer of the data file from the first cloud drive to the second cloud drive based on the first cloud drive being associated with the first security level and the second cloud drive being associated with the second security level;
receiving from the user device, a second request to retrieve particular data stored on at least one cloud drive of the plurality of cloud drives;
determining, using the search index, at least one cloud drive of the plurality of cloud drives that is storing the particular data; and
retrieving the particular data from the at least one cloud drive that is storing the particular data in view of the security policy.

20. The one or more non-transitory storage media of claim 19, wherein the operations further comprise:
generating the search index of data files stored on the plurality of cloud drives associated with the user workspace;
receiving a search query from a user; and
displaying a user interface showing the plurality of cloud drives accessible to the user device.

* * * * *